Nov. 22, 1960 A. FENER 2,961,031
APPARATUS FOR HEAT SEALING AND SEVERING THERMOPLASTIC FILMS
Filed Oct. 28, 1957

INVENTOR.
Alfred Fener
BY
ATTORNEY

United States Patent Office 2,961,031
Patented Nov. 22, 1960

2,961,031

APPARATUS FOR HEAT SEALING AND SEVERING THERMOPLASTIC FILMS

Alfred Fener, Brooklyn, N.Y., assignor to Nicholas Langer, New York, N.Y.

Filed Oct. 28, 1957, Ser. No. 692,756

4 Claims. (Cl. 154—42)

This invention relates to the art of heat sealing layers of thermoplastic film and, more particularly, to a novel apparatus and method for heat sealing such layers and severing sealed portions of such layers from each other in a single operation.

It has been already suggested employing an electrically heated wire as a combination heat sealing and severing member. This wire was tensioned above and spaced from a suitable base and was continuously heated by the passage of an electric current therethrough. When layers of thermoplastic film were brought into contact with the heated wire, the wire would cut or burn through the thickness of the layers and at the same time would heat seal the edges of the cut off layers together. However, as the seal obtained in this manner did not extend inwardly to any appreciable extent, it was relatively weak and unreliable and apparatus based on this principle was not commercially acceptable.

In Patent No. 2,796,913 to Fener and Langer, there is disclosed and claimed a method and apparatus for heat sealing and severing layers of thermoplastic film in which sealing heat and pressure are applied to the layers in a region of appreciable width, for example by means of a heater element in the form of a metal ribbon or band, and substantially simultaneously severing pressure is applied to the center line of said region, for example by means of an unheated or electrically heated wire, thereby bisecting such region while it is still plastic. Thereupon the application of sealing heat is discontinued and preferably the application of pressure is continued for a predetermined period thereafter to have the sealed and substantially severed portions of the layers cool and consolidate under pressure. Heat sealing machines of the described type have been quite successful commercially due to the excellent, strong and uniform character and attractive appearance of the seal formed. However, as the present trend in the packaging industry is definitely in the direction of increasing operating speeds, there was a substantial demand for a combination heat sealing and severing machine capable of very high speeds of operation, a demand which the machines built in accordance with the principles of the above-mentioned Fener and Langer patent could not fully satisfy.

I have discovered that the outstanding problem may be solved in a remarkably simple manner.

It is an object of the present invention to improve heat sealing machines, particularly heat sealing machines of the thermal impulse type.

It is another object of the present invention to provide a novel and improved apparatus for heat sealing layers of thermoplastic film and for cutting through the heat sealed region of the layers in a single operation.

It is a further object of the inveniton to provide a heat sealing machine of the thermal impulse type capable of forming a rapid and clean cut through superposed layers of thermoplastic film while producing simultaneously a strong and uniform heat seal of reinforced character in each cutting edge.

It is also within the contemplation of the invention to provide a combination heat sealing and severing machine which is simple in construction, is capable of reliable and high speed operation, and which may be readily manufactured and sold on a practical and commercial scale at a low cost.

The invention also contemplates a novel method of operating on superposed layers of thermoplastic film whereby such layers are cut into two portions, each of said portions being strongly and positively heat sealed together by means of a bead-shaped seal of reinforced thickness along their respective cutting edges.

Other and further objects and advantages of the invention will become apparent from the following description, taken in conjunction with the accompanying drawing, in which:

Fig. 4 is a view similar to Fig. 3, showing the co-operating bars in their position assumed when the layers of thermoplastic film have been cut through.

Figure 1:
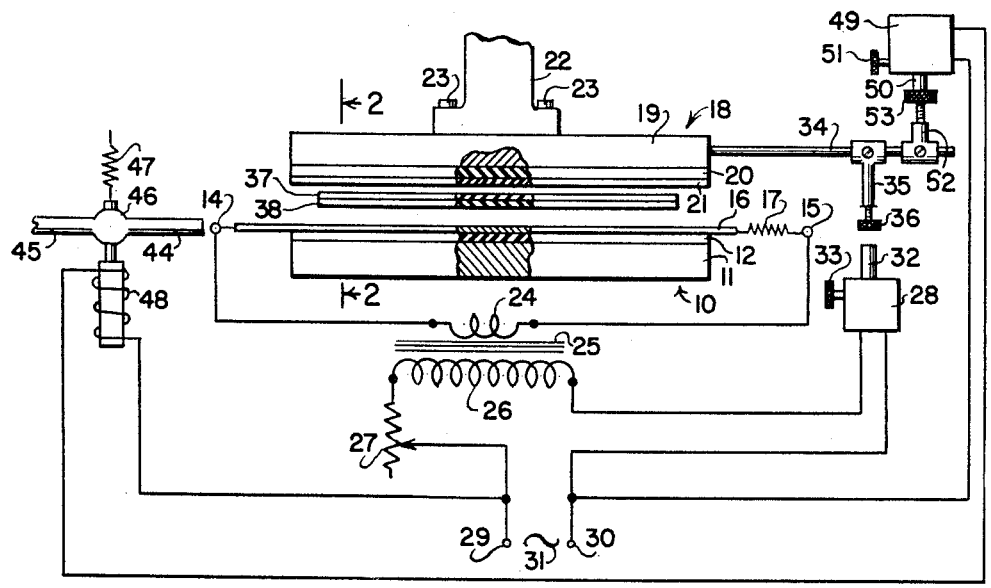
Fig. 1 is a side elevational view, somewhat diagrammatic and fragmentary in character and having parts in section, of a heat sealing and severing machine embodying the principles of the present invention.

Broadly stated, in accordance with the principles of the invention, I provide a sealing bar and a pressure bar, and reciprocating means for said bars for applying pressure upon a pair of layers of thermoplastic film interposed therebetween. The sealing bar is of the thermal impulse type and comprises a rigid base, preferably one formed of metal of high heat conductivity, such as brass, or aluminum. This base is covered with a thin and substantially non-compressible heat-resistant insulating layer upon which there is tensioned an elongated cutting and sealing element, such as a wire, through which short pulses of current may be passed during operation of the machine. A thin fabric woven from glass fibers (Fiberglas) impregnated or coated with tetrafluoroethylene (Teflon) constitutes a very satisfactory material for the said insulating layer whereas the cutting and sealing element or wire is preferably formed of a metal or alloy having high electrical resistivity, such as a nickel-chromium alloy sold under the name "Nichrome." For best results the wire should have a diameter which is considerably greater than the combined thicknesses of the layers to be operated on, while at the same time its diameter should be as small as is compatible with this requirement in order to keep the heat capacity of the wire low.

The pressure bar likewise comprises a rigid base of metal having a first and relatively thick layer of a suitable heat resistant elastomer, such as of a suitable grade of silicone rubber, thereon. This first layer is covered with a second, thin layer of a substantially non-compressible and non-stretchable heat-resistant insulation, such as Teflon-impregnated Fiberglas fabric, which constitutes the operating or pressure applying face of the bar.

In the operation of the machine, the superposed layers of thermoplastic film to be operated upon are introduced between the sealing and pressure bars and pressure is applied thereon. Due to the fact that the sealing and cutting wire is mounted on a substantially non-compressible base, whereas the pressure-applying face of the pressure bar is readily compressible due to the elastic character of the underlying layer, the wire and the regions of the layers in contact therewith are confined in an air space of generally triangular cross section in which the heat produced in the wire is fully effective. A pulse of electric current is then passed through the wire, heating it practically instantaneously to a temperature above the softening temperature of the layers. As a result, the heated wire will quickly and cleanly cut through the superposed layers. At the same time, the cutting edges of the severed layers will be exposed to the appreciable heat of the wire, and, being unrestrained, will shrink and form a reinforcing bead at the edge of the seal. A short period thereafter the heat produced in the wire will be almost completely dissipated and the sealed layers are allowed to cool and to consolidate whereby an extremely strong seal is obtained. Finally, the bars are separated and the sealed layers are withdrawn, whereupon the machine is ready for the next operating cycle.

Figure 2:
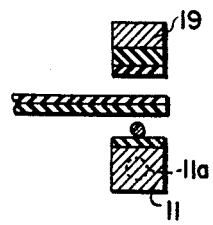
Fig. 2 is a vertical section taken on line 2—2 of Fig. 1.

Referring now more particularly to Figs. 1 and 2 of the drawing, reference numeral 10 generally denotes a sealing bar comprising a base 11 formed of metal of high heat conductivity, such as brass or aluminum, having a thin layer 12 of substantially non-compressible heat-resistant insulation thereon. Upon this layer of insulation, there is tensioned between terminals 14 and 15 an elongated sealing and cutting element or wire 16 of Nichrome by interposition of a tension spring 17. The diameter of said wire is considerably greater than and may be a multiple of the combined thicknesses of the layers of thermoplastic film to be operated upon. Insulating layer 12 is preferably formed of a Fiberglas fabric impregnated with Teflon.

Sealing bar 10 is mounted for co-operation with a pressure bar generally denoted by reference numeral 18, comprising a metal base 19 having a thick layer 20 of a suitable elastomer, such as silicone rubber, thereon. A relatively thin layer 21 of a substantially non-compressible and non-stretchable heat-resistant insulation, such as Teflon-impregnated Fiberglas fabric, is cemented or otherwise secured to elastic layer 20 and constitutes the pressure-applying face of the bar. Pressure bar 18 is mounted for relative reciprocation with respect to sealing bar 10, means for carrying out such reciprocation being diagrammatically indicated by a support 22, secured to base 19 of the pressure bar by means of screws 23.

Terminals 14 and 15 of the sealing and cutting wire 16 are electrically connected with the respective ends of secondary winding 24 of a step-down transformer 25. The ends of primary winding 26 of the said transformer are respectively connected through a rheostat 27 and a time-delay switch 28 to terminals 29 and 30 of a source of alternating current 31. Time-delay switch 28 is of the type which is capable of closing an electric circuit upon its actuating plunger 32 being depressed and to automatically open such circuit a predetermined time delay period thereafter, the length of such time delay period being adjustable by means of adjusting screw 33. As time delay switches of this type are well known to those skilled in the art and do not form part of the present invention, no detailed description of their structure and operation is believed to be necessary.

Pressure bar 18 has a horizontally extending rod 34 mounted thereon from which depends an actuating rod 35 in the lower end of which is threaded a screw 36. Screw 36 is so arranged that during downward displacement of the pressure bar, it will strike against actuating plunger 32 of time delay switch 28, thereby initiating the operating cycle of the machine. The moment in which said cycle begins is adjustable by means of screw 36, which adjust the effective length of actuating rod 35.

Figure 3:
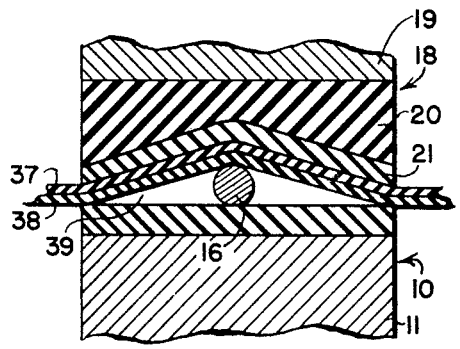
Fig. 3 is a fragmentary vertical sectional view similar to Fig. 2, but drawn to a greatly enlarged scale, showing the sealing bar and the pressure bar of the machine and the layers of thermoplastic film interposed therebetween at the moment when cutting pressure begins to be applied to the said layers.

From the foregoing description, the operation of the machine of the invention will be readily understood by those skilled in the art. When it is desired to operate the machine, layers 37 and 38 of thermoplastic film are introduced between the sealing and pressure bars and the reciprocating means are actuated thereby closing the bars and applying pressure upon the said layers. As it will be best observed in the greatly enlarged fragmentary sectional view shown in Fig. 3, since the non-compressible layer 12 underlying heater wire 16 is mounted on the rigid metal surface of base 11 of the sealing bar and the non-compressible and non-stretchable layer 21 facing the pressure bar is backed by a heavy, elastic and readily compressible layer 20, the operating face of the bars will yield above the wire but will not yield below the wire. Thus, as shown in Fig. 3, in the closed condition of the bars, the wire and the regions of the layers adjacent thereto will be confined in a laterally sealed air space or enclosure 39 of generally triangular cross section.

Figure 4:
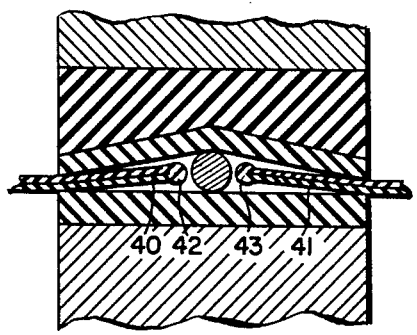
Figure 5:
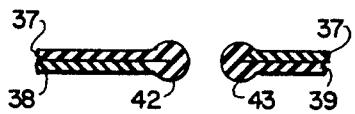
Fig. 5 is a longitudinal sectional view, greatly enlarged for reasons of clarity, of a pair of layers of thermoplastic film operated upon by the apparatus of the invention.

Sometime during downward displacement of pressure bar 18, screw 36 at the end of actuating rod 35 will strike against actuating plunger 32 of time delay switch 28, thereby completing the primary circuit of transformer 25. Heater wire 16 will be energized and, as its heat capacity is quite low, will be practically instantaneously heated to a temperature above the temperature of fusion, or at least softening, of the layers. Due to the fact that in this initial condition illustrated in Fig. 3, the pressure exerted by the wire is concentrated in the line of contact between the wire 16 and layers of film 37 and 38, the heated wire will quickly and cleanly cut through the said layers, separating them into two portions, at the same time sealing each of said portions at least to some extent together along its respective cutting edge. This condition is illustrated in Fig. 4. Furthermore, as the heater wire is still hot and as marginal regions 40 and 41 of the layers are unsupported, the edges of the severed portions will shrink and will form reinforcing beads 42 and 43 in which the thickness of the material is greatly increased. This is made possible by the air space 39 in which the heat produced in the wire is confined and is made fully effective. Experience has demonstrated that the so-called "bead-type" seal formed and further shown in Fig. 5 has superior strength, which greatly exceeds the strength of heat seals obtained by prior procedures.

A short period thereafter, time delay switch 28 will open the primary circuit of transformer 25 and the heater wire 16 will be de-energized. Finally, allowing sufficient time for the sealed and severed layers to completely cool and to consolidate, the bars are separated and the finished product is withdrawn. The machine is then ready for the next operating cycle.

It will be noted that the intensity of the current pulse passed through the heater wire may be adjusted by rheostat 27. The time upon which the heating cycle is initiated may be adjusted by screw 36, determining the effective length of operating rod 35, and the length of such cycle may be determined by adjustment of screw 33 of time delay switch 28. Thus, the machine may be readily adjusted for optimum results to operate upon thermoplastic layers of various composition and gauge.

Although in most cases little, if any, residual heat will accumulate in base 11 of sealing bar 10, forced cooling means may be provided, if desired, for example, in the form of a channel extending longitudinally in base 11 through which a coolant fluid, such as water, may be passed. A channel of this type is shown in dotted lines in Fig. 2 and is denoted by reference numeral 11a.

Considerable variations are possible as to the dimensions of the components used in the sealing and pressure bars. In most cases, however, the heater element will be in the form of a Nichrome wire having a diameter between 0.020″ and 0.030″, the finer gauges being preferred due to their lower heat capacity. Heat-resistant layers 12 and 21 may advantageously be formed of Teflon-impregnated Fiberglas fabric having a thickness between 0.010″ and 0.030″. Elastic layer 20 may be formed of a suitable grade of silicone rubber having a thickness between ⅛″ and ½″. Obviously, the length of the heater wire is determined by the length of the desired seal.

One of the important uses of the machines of the invention consists in applying the top closure seal to the mouth portions of a bag made of thermoplastic film, such as polyethylene, which has been previously filled with the product to be packaged. For reasons of economy, the top closure seal is applied as closely to the open end of the bag as practicable. In this case, the cut-off narrow strip of film constitutes scrap which, if not immediately removed, would tend to accumulate on the sealing bar and may be a source of operating difficulties during subsequent cycles.

To eliminate this difficulty, I provide an automatic scrap blow-off device comprising (Fig. 1) a nozzle 44 connected to a source of compressed air (not shown) through a conduit 45. A slide valve 46 is interposed between conduit 45 and nozzle 44 and may be actuated against the biasing force of a spring 47 to release a blast of air along the face of sealing bar 10 upon operating solenoid 48 being energized. Solenoid 48 is connected in series with the source of alternating current 31 and a time delay switch 49 which is of a type similar to switch 28 in that it is capable of closing the circuit of the solenoid upon its actuating plunger 50 being depressed and to automatically open such circuit a predetermined time delay period thereafter, the length of such time delay period being adjustable by means of adjusting screw 51. A second actuating rod 52 is mounted on the horizontally extending rod 34 of the pressure bar 18 and has a screw 53 threaded in its upper end. Screw 53 is so arranged that during upward displacement of the pressure bar, it will strike against actuating plunger 50 of time delay switch 49. Thus, as soon as the bars begin to be separated, the time delay switch is actuated and closes the circuit of solenoid 48, which in turn opens valve 46 and releases a blast of compressed air from nozzle 44, blowing away any scrap of thermoplastic film that may have remained on the sealing bar. A predetermined period thereafter, the time delay switch automatically interrupts the solenoid circuit so that valve 46 will be closed by the pressure of biasing spring 47.

It will be noted that the machines embodying the principles of the present invention provide a number of important practical advantages. First of all, they may be satisfactorily operated at speeds which greatly exceed those obtainable with prior heat sealing and severing machines. For example, in prior machines, the heat up portion of the sealing cycle or "heat time" was generally between ⅛ of a second and 1 second, and the cooling portion of the cycle, or "dwell time" was between 1 and 6 seconds. In contrast to this, in the meachines of the invention, a "heat time" between 1/15 and ¼ of a second and a "dwell time" between ⅛ and ½ of a second provide very satisfactory results. This very substantial increase in operating speeds is at least in part due to the fact that the combination sealing and cutting wire can be of a relatively small diameter and thus of a very low heat capacity and, furthermore, due to the absence of any interposed layers between the said wire and the layers to be operated upon whereby the heat transfer to the layers is made extremely rapid.

It is also to be observed that the machines of the invention are not only capable of greatly increased operating speeds but also produce heat seals of greatly improved strength and quality. This is accomplished by the novel co-operation of a non-yielding sealing bar having a heater wire tensioned thereon with a pressure bar of particular construction in which a substantially non-compressible and non-stretchable facing layer is combined with an underlaying elastic layer, resulting in the production of a novel "bead-type" seal in a single operation. This new result could not be obtained by means of a conventional heat sealing machine using a heater wire on the sealing bar and an elastic pressure-applying face on the pressure bar as in that case the yielding character of the pressure-applying face would tend to "wrap" the contacting region of the thermoplastic layers around the circumference of the wire, causing extrusion and sticking of the layers to the wire and would make it difficult to obtain clean and reliable severing of the layers in the line of contact.

Moreover, the machines of the invention excel by their structural simplicity and ruggedness and can be readily manufactured on a practical and industrial scale at a low cost.

Although the present invention has been disclosed in connection with a preferred embodiment thereof, variations and modifications may be resorted to by those skilled in the art without departing from the principles of the present invention. I consider all of these variations and modifications to be within the true spirit and scope of the present invention, as disclosed in the foregoing description and defined by the appended claims.

I claim:

1. In combination with a heat sealing machine of the thermal impulse type comprising sealing and pressure bars mounted for co-operation with each other, and reciprocating means therefor; a sealing bar comprising a metal base, a thin layer of substantially non-compressible insulation on said base, and a heater wire tensioned on said layer of insulation; a pressure bar comprising a metal base, a relatively thick first layer of readily compressible elastic material on said base, and a relatively thin second layer of flexible but substantially non-compressible heat-resistant insulation on said first layer constituting the pressure-applying face of the bar; the diameter of said heater wire being substantially greater than the combined thicknesses of the layers of thermoplastic film interposed between the bars whereby upon reciprocation of said bars and as a result of the non-yielding support of the wire and of the yielding support and non-stretching character of the pressure-applying face, the said wire and the region of the film in contact therewith will be confined in an airspace of generally triangular cross section in which the sealing heat of the wire is fully effective; and the switching means operable in timed relation with respect to said reciprocating means to pass a pulse of current through said wire while said wire and said regions of the film are confined in said air space thereby to cause heat sealing and severing of said regions of the film while the severed edges of the film remain free to shrink into a bead.

2. In combination with a heat sealing machine of the thermal impulse type comprising sealing and pressure bars mounted for cooperation with each other, and reciprocating means therefor; a sealing bar comprising an elongated metal base of metal of high heat conductivity having a plane and rigid mounting face, a thin layer of substantially non-compressible heat-resistant insulation on said face, and a heater wire tensioned on said layer longitudinally of said base; a pressure bar comprising an elongated rigid metal base, a first and relatively thick layer of a readily compressible elastomer on said base, and a second and relatively thin layer of flexible but substantially non-compressible and non-stretchable heat-resistant insulation on said first layer constituting the operating and pressure-applying face of the bar; the diameter of said heater wire being a multiple of the combined thicknesses of the layers of thermoplastic film interposed between the bars whereby upon reciprocation of said bars and as a result of the non-yielding support of the wire and of the yielding support of the non-stretchable pressure-applying face, the said wire and the region of the film in contact therewith will be confined in a sealed enclosure of generally triangular cross section in which the heat generated in the wire is fully effective; and switching means operable in timed relation with respect to said reciprocating means to pass a pulse of current through said wire while said wire and said region of the film are thus confined to cause cutting of the layers in the line of contact and the formation of a heat sealed bead at both cutting edges.

3. The heat sealing machine defined in claim 2, wherein the base of the sealing bar is provided with a longitudinally extending channel through which a cooling fluid may be passed.

4. The heat sealing machine defined in claim 2, wherein means are provided for directing a blast of compressed air along the operating face of the sealing bar upon separation of the bars thereby to remove the layers of thermoplastic film cut off from the remainder of the film.

References Cited in the file of this patent

UNITED STATES PATENTS

| | | |
|---|---|---|
| 1,916,134 | Dike | June 27, 1933 |
| 2,185,647 | Penn | Jan. 2, 1940 |
| 2,574,094 | Fener et al. | Nov. 6, 1951 |
| 2,670,783 | Moravec | Mar. 2, 1954 |
| 2,682,294 | Langer | June 29, 1954 |
| 2,725,091 | Miner et al. | Nov. 29, 1955 |
| 2,726,706 | Hakomaki | Dec. 13, 1955 |
| 2,786,511 | Reid | Mar. 26, 1957 |
| 2,796,913 | Fener et al. | June 25, 1957 |
| 2,796,914 | Park | June 25, 1957 |
| 2,802,086 | Fener | Aug. 6, 1957 |